Nov. 30, 1948.   N. F. BARNES   2,454,959
OPTICAL APPARATUS FOR SHOWING ROTATING PARTS AT REST
Filed Feb. 18, 1946   2 Sheets-Sheet 1
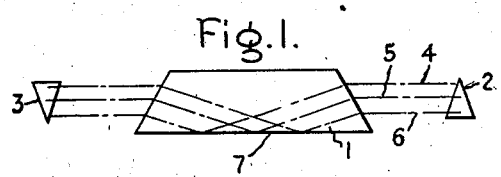
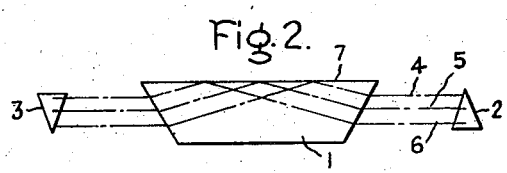
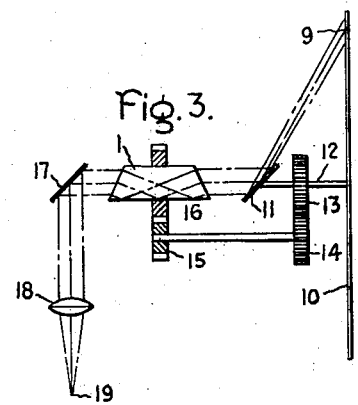
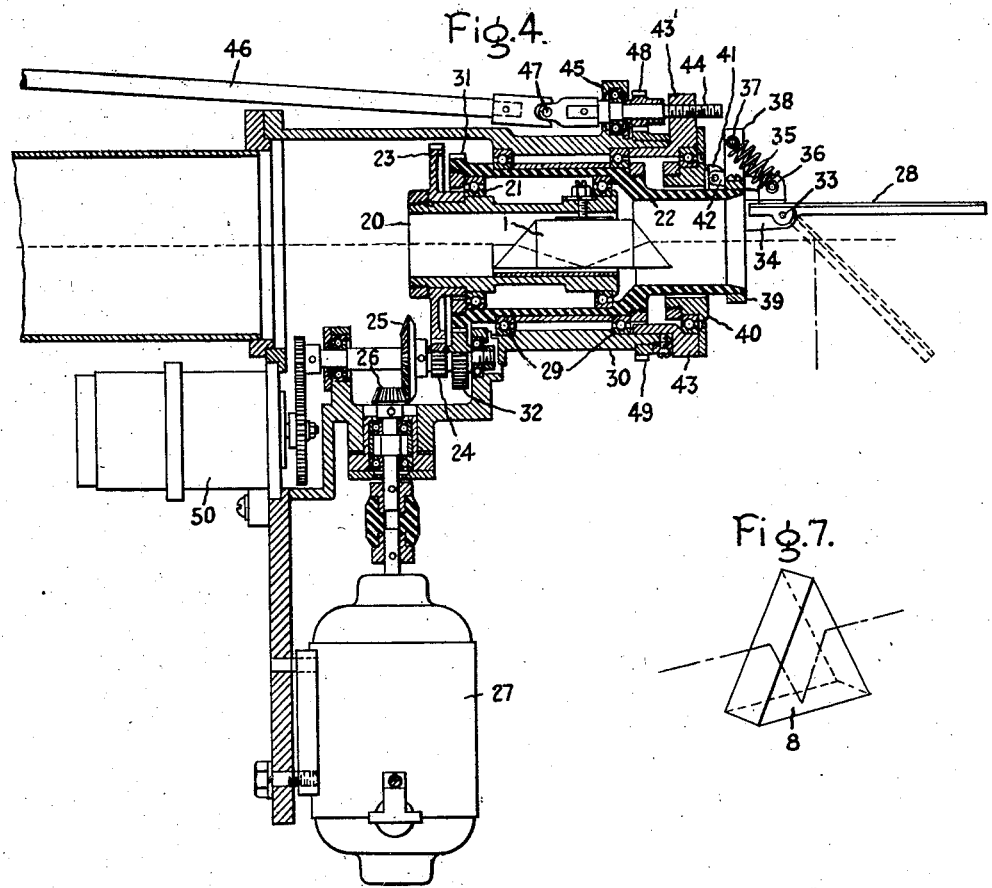
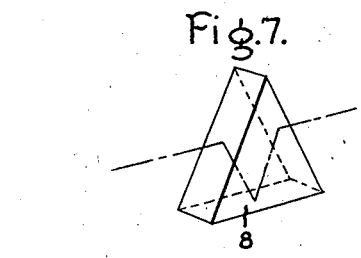
Inventor:
Norman F. Barnes,
by *Prowell S. Mack*
His Attorney.

Nov. 30, 1948.    N. F. BARNES    2,454,959
OPTICAL APPARATUS FOR SHOWING ROTATING PARTS AT REST
Filed Feb. 18, 1946    2 Sheets-Sheet 2
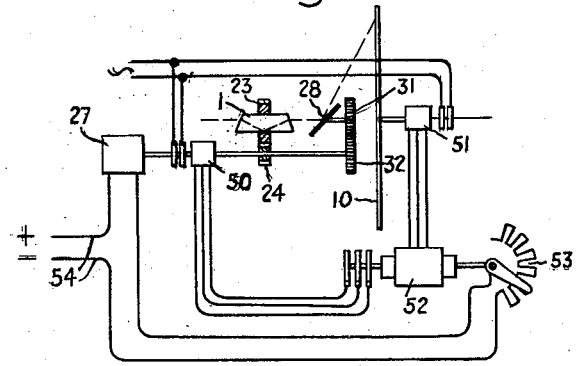
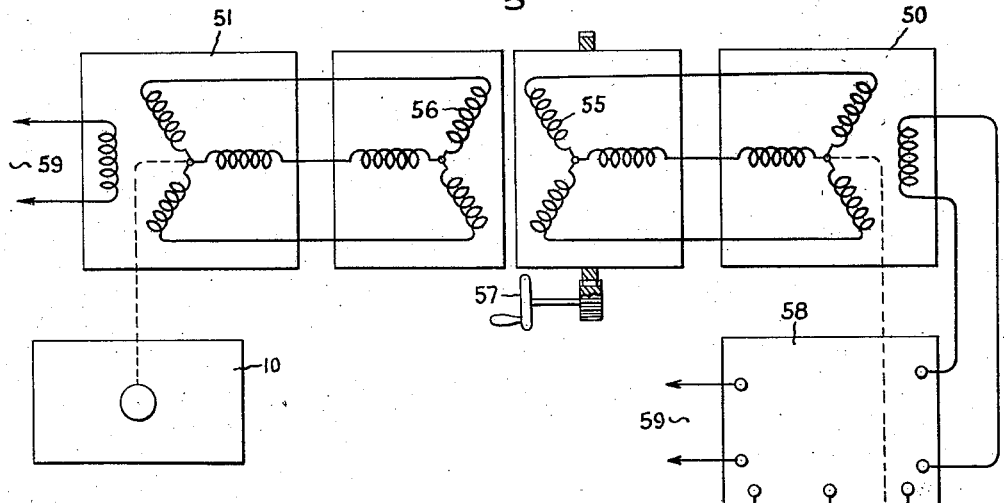
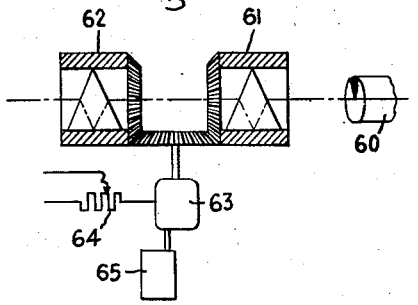
Inventor:
Norman F. Barnes,
by Charles S. Mack
His Attorney.

Patented Nov. 30, 1948

2,454,959

UNITED STATES PATENT OFFICE 2,454,959

OPTICAL APPARATUS FOR SHOWING ROTATING PARTS AT REST

Norman F. Barnes, Schenectady, N. Y., assignor to General Electric Company, a corporation of New York Application February 18, 1946, Serial No. 648,428

1 Claim. (Cl. 88—14)

1

My invention relates to apparatus for the continuous visual inspection of rotating apparatus.

The features of my invention which are believed to be novel and patentable will be pointed out in the claim appended hereto. For a better understanding of my invention, reference is made in the following description to the accompanying drawings in which Figs. 1 and 2 show an object as observed through a Dove prism when the prism is rotated on its axis through an angle of 180 degrees, illustrating a basic principle employed in my apparatus; Fig. 3 represents a simplified embodiment of my invention; Fig. 4 represents a preferred form of prism rotating and mirror angle adjusting apparatus embodying my invention; Fig. 5 is a simplified wiring diagram for the speed control of the rotating prism such as is shown in Fig. 4; Fig. 6 represents a preferred form of such speed control employing electronic current control; Fig. 7 represents another form of image revolving prism; and Fig. 8 represents a tachometer embodying my invention.

Referring now to Fig. 1, at 1, I have represented an optical prism of a form which is sometimes called a Dove prism. If an object 2 be observed through the longitudinal axis of the prism as represented in Fig. 1, such object will appear as inverted. Thus, if the observer's eye be placed at point 3 looking towards 2 through the prism, the object will appear inverted as drawn at point 3. The reason for this is seen from tracing light rays 4, 5, and 6 from the top, middle, and bottom of the object through the prism to the point of observation at 3. The horizontal light rays are bent downward as they enter the right-hand end of the prism, are reflected upward by the broad surface 7 of the prism, and then bent downward to the horizontal as they leave the left end of the prism. Due to the shape and dimensions of the prism, the upper ray 4 travels farther in a downward direction in the prism than in the upward direction, and hence, appears lower down as it leaves the prism; while the lower beam 6 travels farther in an upward than in a downward direction in the prism, and hence, appears higher up as it leaves the prism. The center beam 5 travels the same distance up and down in the prism, and hence, emerges on the some horizontal level as it entered. Hence, the object as thus observed through the axis of the prism in Fig. 1 appears inverted, but otherwise in its true perspective as to size and shape, and alignment with the center line which is the horizontal line of beam 5.

Fig. 2 shows the prism 1 as having been rotated on its central horizontal axis, corresponding to the axis of the central horizontal ray 5, 180 degrees from the position of Fig. 1. While the upper and lower rays 4 and 6 take quite different paths through the prism, the observed image is exactly the same as in Fig. 1, and is inverted but otherwise in its true perspective as to size, shape, and alignment. If the object 2 is observed through the prism on the axis of revolution during such 180-degree rotation of the prism, the image would appear to have made a complete revolution in a direction opposite to that in which the prism is turned. Furthermore, the image is always in true perspective of the object observed except as to orientation about the axis of revolution. For the purpose of this application prisms which are capable of this optical phenomenon are called image revolving prisms, and the axis about which the prism is revolved and through which the phenomenon is observed is called the image revolving axis. It will be evident that this optical phenomenon requires a certain length of the prism in relation to the distance of the reflecting surface 7 from the axis of rotation of the prism for a given coefficient of refraction and surface angles at the prism ends. The prism may have a square cross section and will then have a length-to-thickness ratio (the length being measured at the center) of nearly 4½ to 1, and will have equal angles between the end surfaces and the internal reflecting side 7, the value of such angles depending upon the index of refraction of the material used. For a discussion of the design of Dove prisms, see page 158 of "Fundamentals of Optical Engineering" by Jacobs; McGraw-Hill Book Co., 1943. Such a prism, called a Dove prism, has the property of producing a rotation of light beams passing through it when the prism itself is rotated about its long axis. This optical rotation occurs at a speed exactly twice that speed at which the prism is mechanically rotated. If the object 2, Fig. 1, be rotated about the center axis beam 5, and the prism 1 be rotated in the same direction about the same axis at half the speed of the object, a counter-rotation of the image of the rotating object will occur and it will appear at point 3 as if standing still.

Fig. 7 shows another form of image revolving prism capable of producing this image inversion and counter-rotation of the image. Here the prism is preferably made of flint glass and has its internal reflecting surface 8 silvered. The three prism angles are each 60 degrees. Either form of prism may be used in my invention.

In Fig. 3, I have shown a simple form of apparatus embodying my invention, adapted for observing a certain part 9 of a rotating object 10. The object 10 may, for example, be the propeller wing of an Autogiro, and the part 9 one of its tips, and the purpose of the arrangement being to observe the nature and extent of bending or vibration of the part 9 at various speeds of the propeller. On the axis of rotation of the propeller is a mirror 11 set at an angle to reflect the surface at 9 along the axis of rotation. This mirror is driven at the same speed and in the same direction as propeller 10 so as always to reflect the same spot 9 at all rotative positions of the propeller. As represented, the mirror is mounted on a shaft extension 12 of the propeller and is thus driven with it. This arrangement has the effect of bending the axis of revolution of the light rays such that the center of spot 9 lies on such axis with the spot revolving about such center when the object 10 is revolved. Here the rotating object of which a stationary image is produced is the spot at 9 of appreciable area. Also on the axis of rotation is a Dove prism 1 mounted for rotation and driven from shaft extension 12 at one-half the speed of propeller 10, and in the same direction through gears 13, 14, 15, and 16. For convenience of the observer, a mirror 17 may be used to reflect the image at any desired observation angle from the axis of rotation. A condensing lens 18 is preferably used to assist in focusing the image rays to the position of the observer's eye at 19. As thus arranged, the part of surface at 9 on the propeller may be continuously observed as if the propeller were stationary while the propeller is rotating at any and all speeds. The image will of course show any bending or vibration of the surface at 9 but the apparatus will cancel out the rotary movement of the propeller blade about its axis of rotation. The angle of the mirror 17 may be changed to observe different parts of the periphery of the propeller 10 or parts nearer its axis of rotation. The apparatus differs from a stroboscope in that the point under observation is observed continuously and not intermittently as with a stroboscope. Also, changes in the speed of rotation of the object under observation have no effect upon the proper functioning of the apparatus. It is equally effective at any speed from zero upward without adjustment.

A preferred form of apparatus which is mechanically independent of the rotating part under observation is shown partially in section in Fig. 4. A Dove prism 1 is adjustably mounted in a tubular holder 20. Holder 20 is mounted for rotation on its axis and the longitudinal axis of the prism 20 by means of ball bearings 21 in a second tubular supporting member 22, and may be driven through gears 23, 24, 25, and 26 by an adjustable speed electric motor 27. The tubular supporting member 22 is also rotatively mounted on the same axis as the prism 1 and carries a reflecting mirror 28 serving the purpose of mirror 11, Fig. 3. Tubular support 22 is rotatively mounted by ball bearings 29 in a stationary housing 30 and is driven in the same direction and at twice the speed of prism 1 from motor 27 through gears 31, 32, 25, and 26.

The mirror 28 is hinged at 33 between a pair of lugs 34, only one of which is shown in the sectional view, Fig. 4; and the mirror is biased about its pivot 33 to the inactive position shown in full lines in Fig. 4 by a spring 35 fastened between a lever arm 36 extending from the back of the mirror near its pivot and a crosspin 37 extending between a pair of lugs 38, only one of which is shown, and which are on a collar 39 which is secured about the right end of tubular support 22. Lugs 34 are also supported from collar 38. Rotatable with tubular part 22 but slidable endwise thereon is a collar section 40 having a lug 41 extending from its right-hand end on the side of the axis of rotation of the prism on which the mirror 28 is pivoted. Between lug 41 and lugs 36 there is a link connection 42 so that by sliding collar section 40 to the right, the mirror may be turned about its pivot 33 to some such position as indicated in dotted lines, this movement being resisted by the tensioning of spring 35. The adjusted position of collar section 40 and mirror 28 is determined by the adjusted position of an outer collar section 43 which does not rotate with tubular part 22 but which is slidably adjustable in an axial direction within stationary housing 30. There is a ball bearing connection between collar sections 40 and 43 so that they both participate in the same endwise sliding action, although part 40 rotates and part 43 does not. The endwise movement of these mirror angle adjusting parts is controlled by three bolts 44 threaded through lugs 43' in collar section 43 and rotatively supported in bearings 45 on the exterior of housing 30. One of these bolts may be turned by a rod 46 connected with the bolt through a universal joint 47. The other bolts 44 not shown are turned with the one shown through gearing, part of which is shown at 48 and 49. Thus, by turning rod 46, the mirror angle may be changed while the mirror is rotating at double the speed of the prism 1.

The electrical control of the speed of the driving motor 27 of Fig. 4 is somewhat schematically illustrated in Fig 5. The speed of motor 27 is measured by a synchronous rotary motion Selsyn device 50, the speed of the object 10 under investigation is measured by a similar Selsyn device 51, and these speeds are compared by a differential Selsyn device 52 having stationary and rotary parts electrically connected with Selsyn devices 51 and 50, respectively. If the speed of motor 27 is correct or such as to drive mirror 28 at the same speed and prism 1 at half speed of object 10, there is no rotary movement of the rotary part of the differential Selsyn 52. However, if motor 27 is fast, Selsyn 52 will rotate in one direction and if slow, in the opposite direction; and such rotary movement may be used to control the speed of motor 27 so as to keep it correct. To this end rotary movement of differential Selsyn 52 is arranged to adjust a rheostat 53 in the supply circuit 54 of motor 27.

Generally a more refined speed control is desirable and in addition, rotary control of mirror 28 about the axis of rotation of prism 1 while the apparatus is in operation. This is provided for in the control of Fig. 6. As in Fig. 5, 50 and 51 represent the Selsyn devices for measuring the speeds of the motor 27 and the object 10 under observation. The differential Selsyn has both of its alternating current windings 55 and 56 normally stationary, although one winding 55 is supported so that it can be manually rotatively adjusted relative to winding 56 by a hand wheel 57. The power supply for the series direct current reversible motor 27 which drives the mirror 28 and prism 1 of Fig. 4 is through a phase sensitive electronic control apparatus 58. Both the Selsyn system and the phase sensitive electronic control apparatus are supplied from the same source of alternating current 59, and the electronic control apparatus is electrically connected to the single phase winding of the Selsyn device 50 in a way to be sensitive to the direction and amount of phase shift between the source of supply 59 and any signal coming to it from Selsyn 50. When motor 27 is rotating the prism 1 and mirror 28 at the correct speeds to observe the object 10 as stationary, no signal comes to the electronic control apparatus 58 through the Selsyn system, and under such conditions the controller 58 is adjusted to supply motor 27 with the proper amount of power to operate it at correct speed. Now any change in this speed relation between object 10 and motor 27 will be reflected by a signal through the Selsyn system which signal will be a single phase alternating current voltage having a phase relation relative to source 59 which depends upon the direction of the departure from correct speed relation, and of a magnitude proportional to such departure, which signal will immediately change the power input to motor 27 to reestablish the correct speed relation. Such apparatus will cause the motor 27 to follow the speed changes, including starting, stopping, and reversing of object 10, precisely. During such operation the mirror 28, Fig. 4, may be swung from the full line position shown to a position such as is shown in dotted lines by turning rod 46, so that any part of the rotating object from its axis of rotation to its periphery along a given radial line can be observed in detail while it is rotating at high speed.

If, now, it is desired to examine some portion of the rotating object on a different radial line, the adjustable winding 55 of the differential Selsyn is rotated relative to winding 56. This results in a shift in phase relation between these windings and a resulting signal to the thermionic regulating apparatus which will cause the motor 27 temporarily to speed up or slow down relative to object 10 until the signal disappears and the mirror 28 has been rotatively shifted on object 10 by a corresponding amount. Thus, the entire surface of object 10 which faces toward the prism 1 can be examined by the use of the apparatus while such object is rotating at any speed and, of course, also when standing still. The speed at which object 10 is rotating at any time can of course be measured by measuring the speed of the rotating prism 1 with a tachometer and multiplying the reading by 2.

Fig. 8 shows a simple tachometer embodying the principle of the invention. At 60 is represented the end of a high speed shaft having a distinctive mark on one radius so as to be readily observed. In line with the end of the shaft is a pair of rotatively mounted prism holders 61 and 62 having prisms therein of the form shown in Fig. 7. At 63 is an electric motor geared to the two prism holders so as to drive them in opposite directions at the same speed, which speed is adjustable by means of a variable resistance 64 in the motor supply circuit. The motor also is connected to operate a conventional tachometer 65 of any suitable type.

When the shaft 60 is rotating and with the two prisms rotating at one-fourth the speed of the shaft, prism holder 61, rotating in the same direction and prism holder 62 rotating in the opposite direction to the shaft, the image of the end of the shaft will appear to stand still when viewed through the tow prisms. To measure the speed of shaft 60, the speed of motor 63 is adjusted until the stationary image appears and then the speed is read on tachometer 65. If a 1-to-1 gear ratio is used between the motor and prism holders, the actual speed of shaft 60 is four times the observed speed as read on the tachometer. For this application exact alignment of the image revolving axis of the prism means with the axis of rotation of the shaft is not important. By adding or subtracting prisms, a wide variety of reduced speed ratio tachometers become available. For example, with a four-prism system the prisms would rotate at one-eighth the speed of the shaft to observe the stationary image. The alternate prisms in the series visual relation in such a system must be driven in opposite directions but all should be driven at the same speed.

While the image which is observed with the apparatus described is in its true perspective if reasonable care is obtained in selecting mirrors and prisms and their proper alignment, the resulting image is inverted. In any case where an inverted image is objectionable, it can be reinverted by known optical means.

In accordance with the provisions of the patent statutes I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

Apparatus for continuously producing a stationary image of a revolving object comprising apparatus having an image revolving prism mounted for rotation on its image revolving axis, a mirror for reflecting an image of an object at one side of said axis along said axis so that the same may be observed through the prism, a motor for revolving both the prism and the mirror on said axis, with the mirror revolving at twice the speed of the prism, a synchronous motion transmitting system including a Selsyn device driven by said motor and a Selsyn device adapted to be driven by the rotating object, and a differential Selsyn device electrically connected in said system between the first two mentioned Selsyn devices, speed control means for said motor for obtaining a predetermined speed relation between said mirror, prism and rotating object such that the image of the rotating object as reflected by said mirror and observed through said prism will appear stationary, said speed control means including a phase angle responsive electronic controller for said motor which controller is responsive to changes in phase relation detected by said synchronous motion transmitting system when said speed relation departs from said predetermined relation, said differential Selsyn having a pair of relatively rotatable normally stationary windings through which the motion transmitting system is inductively coupled, and means for adjusting the relative rotary positions of said windings for the purpose of shifting the angular rotative relation between said mirror and rotating object.

NORMAN F. BARNES.

REFERENCES CITED

The following references are of record in the file of this patent:

UNITED STATES PATENTS

| Number | Name | Date |
| --- | --- | --- |
| 1,735,100 | Wohlrabe | Nov. 12, 1929 |
| 2,280,492 | Kenngott | Apr. 21, 1942 |
| 2,405,731 | Beggs et al. | Aug. 13, 1946 |

FOREIGN PATENTS

| Number | Country | Date |
| --- | --- | --- |
| 263,797 | Germany | Sept. 11, 1913 |
| 703,362 | Germany | Mar. 7, 1941 |
| 67,372 | Sweden | May 14, 1929 |

OTHER REFERENCES

Scientific American for July 1925, page 55.